US012623431B2

(12) United States Patent
Wang et al.

(10) Patent No.: US 12,623,431 B2
(45) Date of Patent: May 12, 2026

(54) FOAM SHEET CORE FOR COMPOSITE SANDWICH STRUCTURES AND METHOD OF MAKING THE SAME

(71) Applicant: The Boeing Company, Arlington, VA (US)

(72) Inventors: Xiaoxi Wang, Mukilteo, WA (US); Gary E. Georgeson, Tacoma, WA (US)

(73) Assignee: THE BOEING COMPANY, Arlington, VA (US)

( * ) Notice: Subject to any disclaimer, the term of this patent is extended or adjusted under 35 U.S.C. 154(b) by 90 days.

(21) Appl. No.: 18/641,613

(22) Filed: Apr. 22, 2024

(65) Prior Publication Data

US 2024/0269955 A1    Aug. 15, 2024

Related U.S. Application Data

(63) Continuation of application No. 17/370,259, filed on Jul. 8, 2021, now abandoned.

(51) Int. Cl.
| | |
|---|---|
| *B32B 3/12* | (2006.01) |
| *B32B 5/18* | (2006.01) |
| *B32B 7/10* | (2006.01) |
| *B32B 27/06* | (2006.01) |

(Continued)

(52) U.S. Cl.
CPC .................. *B32B 3/12* (2013.01); *B32B 5/18* (2013.01); *B32B 7/10* (2013.01); *B32B 27/065* (2013.01); *B32B 37/146* (2013.01); *B32B 38/0004* (2013.01); *B32B 2255/102* (2013.01); *B32B 2255/26* (2013.01); *B32B 2266/0214* (2013.01); *B32B 2305/08* (2013.01);

(Continued)

(58) Field of Classification Search
CPC ............ Y10T 156/1003; B29C 66/438; B29C 66/72525; B29C 66/7254; B32B 2305/024; B32B 3/12; B32B 37/146; B29D 99/0089
See application file for complete search history.

(56) References Cited

U.S. PATENT DOCUMENTS

| | | | |
|---|---|---|---|
| 3,660,217 A | 5/1972 | Kehr et al. | |
| 3,853,681 A | * 12/1974 | Kehr ...................... | C08G 75/12 |
| | | | 522/90 |

(Continued)

FOREIGN PATENT DOCUMENTS

| | | |
|---|---|---|
| CN | 108790289 A | 11/2018 |
| CN | 112976701 A | 6/2021 |
| JP | 2007230130 A | 9/2007 |

OTHER PUBLICATIONS

British Plastics Federation (BPF)—Polypropylene (PP): https://www.bpf.co.uk/plastipedia/polymers/PP.aspx (Year: 2023).

(Continued)

*Primary Examiner* — Carson Gross
(74) *Attorney, Agent, or Firm* — MH2 Technology Law Group LLP

(57) ABSTRACT

A foam sheet core, including a plurality of foam sheet walls defining an array of hollow cells, wherein the plurality of foam sheet walls are bonded together to form the array of hollow cells, each of the plurality of foam sheet walls has a thickness from about 0.002 inches to about 0.08 inches, and each of the plurality of foam sheet walls has an average height from about 0.05 inches to about 5 inches.

20 Claims, 11 Drawing Sheets

(51) Int. Cl.
  B32B 37/14 (2006.01)
  B32B 38/00 (2006.01)

(52) U.S. Cl.
  CPC ..... *B32B 2305/30* (2013.01); *B32B 2307/102* (2013.01); *B32B 2307/3065* (2013.01)

(56) References Cited

U.S. PATENT DOCUMENTS

| | | | | |
|---|---|---|---|---|
| 4,249,976 | A * | 2/1981 | Hudson | B32B 3/12 |
| | | | | 428/116 |
| 4,957,577 | A * | 9/1990 | Huebner | B29C 65/08 |
| | | | | 428/116 |
| 4,966,801 | A | 10/1990 | Becker et al. | |
| 5,421,935 | A * | 6/1995 | Dixon | B29C 66/438 |
| | | | | 428/116 |
| 6,153,687 | A * | 11/2000 | Wang | B29D 99/0089 |
| | | | | 524/391 |
| 7,048,986 | B2 | 5/2006 | Shah et al. | |
| 7,507,461 | B2 | 3/2009 | Wang et al. | |
| 8,992,709 | B2 | 3/2015 | Saff et al. | |
| 2004/0253407 | A1 * | 12/2004 | Shah | B32B 7/12 |
| | | | | 428/117 |
| 2007/0256379 | A1 | 11/2007 | Edwards | |
| 2009/0283635 | A1 | 11/2009 | Gerken et al. | |
| 2010/0330330 | A1 | 12/2010 | Luca et al. | |
| 2015/0047113 | A1 | 2/2015 | Stringfellow et al. | |
| 2017/0217389 | A1 | 8/2017 | Macaraeg | |
| 2018/0126680 | A1 | 5/2018 | Pflug | |
| 2018/0281339 | A1 | 10/2018 | Hull et al. | |
| 2020/0039156 | A1 | 2/2020 | Wang et al. | |
| 2020/0207033 | A1 | 7/2020 | Wang et al. | |
| 2021/0001519 | A1 | 1/2021 | Wang et al. | |
| 2021/0001571 | A1 | 1/2021 | Santiago et al. | |
| 2021/0138734 | A1 | 5/2021 | Maben et al. | |
| 2021/0261232 | A1 | 8/2021 | Georgeson et al. | |

OTHER PUBLICATIONS

FPCfoam.com Foam Products Corporation (FPC) (DuPont Styrofoam(TM)): https://www.fpcfoam.com/foam-products-manufacturer/styrofoam (Year: 2022).

https://coastal-automotive.com/wp-content/uploads/2020/12/Coastal-Automotive-IMPAXX-Product-Data-Sheet.pdf (Year: 2020).

Extended European Search Report dated Nov. 23, 2022 for corresponding Application No. 22182981.5, 8 pages.

Extended European Search Report issued Nov. 23, 2022 in corresponding European Application No. 22182981.5, 8 pages.

Polystyrene, Handbook of Polymers, ChemTec Publishing, p. 547 (Year: 2012).

Communication Pursuant to Article 94(3) EPC issued Jul. 25, 2025 in related European Application No. 22182981.5, 7 pages.

First Notification of Office Action and Search Report, dated Nov. 14, 2025, for Chinese Application No. 202210765625.1, 19 pages including English translation.

* cited by examiner

800

810 STACKING TWO OR MORE FOAM SHEETS INTO A FOAM SHEET BLOCK

820 BONDING THE FOAM SHEET BLOCK

830 SLICING THE BONDED FOAM SHEET BLOCK INTO ONE OR MORE STRIPS OF FOAM SHEET

840 EXPANDING THE ONE OR MORE STRIPS OF FOAM SHEET INTO A FOAM SHEET CORE

850 COATING THE EXPANDED FOAM SHEET CORE WITH A RESIN COAT

860 FILLING ONE OR MORE HOLLOW CELLS

900

1000

SPECIFICATION AND DESIGN — 1102

MATERIAL PROCUREMENT — 1104

COMPONENT AND SUBASSEMBLY MANUFACTURING — 1106

SYSTEM INTEGRATION — 1108

CERTIFICATION AND DELIVERY — 1110

IN SERVICE — 1112

MAINTENANCE AND SERVICE — 1114

FOAM SHEET CORE FOR COMPOSITE SANDWICH STRUCTURES AND METHOD OF MAKING THE SAME

CROSS-REFERENCE TO RELATED APPLICATIONS

This application is a continuation of U.S. patent application Ser. No. 17/370,259 filed on Jul. 8, 2021, which is incorporated by reference herein in its entirety.

TECHNICAL FIELD

The present disclosure generally relates to composite sandwich structures, and more particularly, to foam sheet cores for composite sandwich structures and methods for making the same.

BACKGROUND

Composite sandwich structures generally include a core sandwiched between two face sheets. Often, the core includes cells or air pockets to reduce the weight of the composite sandwich structure as compared to equivalent structures made of solid materials. This reduced weight has led to increased use of composite sandwich structures in the aerospace industry to reduce the weight of aircraft components.

The core may be formed of various materials, including, but not limited to, metal, laminate, or paper honeycombs, or solid or machined polymer foams. The face sheets may be formed from composite sheets, such as those formed of multiple laminated plies of a fiber reinforced resin. However, a number of chemicals are involved in the creation of traditional honeycombs, such as adhesives and thermoset resins, which are difficult to recycle. In addition, traditional honeycomb cores have almost reached a limit in the weight reduction they offer, while traditional foam cores lack the large open cells of honeycomb cores.

Accordingly, there is a need for composite sandwich cores that offer improvements in weight reduction and offer reduction in the use adhesives and thermoset resins, as well as offering variability of core density. In addition, there is a desire for composite sandwich cores that require no curing process or may be formed as an out of autoclave process.

BRIEF SUMMARY

This summary is intended merely to introduce a simplified summary of some aspects of one or more implementations of the present disclosure. This summary is not an extensive overview, nor is it intended to identify key or critical elements of the present teachings, nor to delineate the scope of the disclosure. Rather, its purpose is merely to present one or more concepts in simplified form as a prelude to the detailed description below.

The foregoing and/or other aspects and utilities exemplified in the present disclosure may be achieved by providing a foam sheet core, including a plurality of foam sheet walls defining an array of hollow cells, wherein the plurality of foam sheet walls can be bonded together to form the array of hollow cells, wherein each of the plurality of foam sheet walls can have a thickness from about 0.002 inches to about 0.08 inches, and wherein each of the plurality of foam sheet walls can have an average height from about 0.05 inches to about 5 inches.

The plurality of foam sheet walls can be fusion bonded together to form the array of hollow cells, the foam sheet core can consist essentially of the plurality of foam sheet walls defining the array of hollow cells, and the foam sheet core may not include an adhesive.

Each of the array of hollow cells can have an average diameter from about 0.1 inches to about 1.0 inches and an average height from about 0.05 inches to about 5 inches.

The plurality of foam sheet walls can include a foamed polymer, and the foamed polymer can include at least one of phenolic, epoxy, polystyrene (PS), polyethylene (PE), polypropylene (PP), polyamide (PA), polyethylene terephthalate (PET), polyether ether ketone (PEEK), polyetherketoneketone (PEKK), polycarbonate (PC), polyetherimide (PEI), polyphenylsulfone (PPSU), thermoplastic polyurethane (TPU), acrylonitrile butadiene styrene (ABS), polyvinyl Chloride (PVC), polyurethane (PU), or combinations thereof.

At least one of the plurality of foam sheet walls can include a different foamed polymer than the rest of the plurality of foam sheet walls.

The foamed polymer can have a relative density to solid from about 2.5% to about 100% and a melting temperature from about 270° F. to about 800° F.

The plurality of foam sheet walls can further include reinforcing fibers, and the reinforcing fibers can include one or more of carbon fibers, fiberglass fibers, aramid fibers, ultra-high molecular weight polyethylene (UHMWPE) fibers, polyester fibers, polypropylene (PP) fibers, polyethylene (PE) fibers, polyamide fibers, or combinations thereof.

At least one of the hollow cells in the array of hollow cells can include a filling material, and the filling material can include at least one of rubber foam, epoxy, phenolic, polystyrene (PS) foam, polyurethane (PU) foam, polyester foam, melamine foam, or combinations thereof.

The filling material can be different from the foamed polymer forming the foam sheet walls, and the filling material can enhance at least one of a fire-retardance of the foam sheet core, a rigidity or stiffness of the foam sheet core, an acoustic insulation of the foam sheet core, an impact resistance of the foam sheet core, or combinations thereof.

The foregoing and/or other aspects and utilities exemplified in the present disclosure may also be achieved by providing a composite sandwich structure including a foam sheet core; and one or more skin panels, wherein the foam sheet core can be fusion bonded to the one or more skin panels, and wherein the foam sheet core can include a plurality of foam sheet walls defining an array of hollow cells, wherein the plurality of foam sheet walls can be bonded together to form the array of hollow cells, wherein each of the plurality of foam sheet walls can have a thickness from about 0.002 inches to about 0.08 inches, and wherein each of the plurality of foam sheet walls can have an average height from about 0.05 inches to about 5 inches.

The composite sandwich structure can be substantially-free of adhesives.

The one or more skin panels can include one or more of phenolic, epoxy, polypropylene (PP), polyamide (PA), polyethylene terephthalate (PET), polyether ether ketone (PEEK), polyetherketoneketone (PEKK), polycarbonate (PC), polyetherimide (PEI), polyphenylsulfone (PPSU), thermoplastic polyurethane (TPU), acrylonitrile butadiene styrene (ABS), polyvinyl Chloride (PVC), polyurethane (PU), or combinations thereof.

The foregoing and/or other aspects and utilities exemplified in the present disclosure may also be achieved by providing a multi-core composite sandwich structure, including two or more foam sheet cores; one or more skin panels; and one or more septum, wherein the two or more foam sheet cores can be fusion bonded to the one or more skin panels and the one or more septum; and wherein each foam sheet core includes a plurality of foam sheet walls defining an array of hollow cells, wherein the plurality of foam sheet walls can be bonded together to form the array of hollow cells, wherein each of the plurality of foam sheet walls can have a thickness from about 0.002 inches to about 0.08 inches, and wherein each of the plurality of foam sheet walls can have an average height from about 0.05 inches to about 5 inches.

The multi-core composite sandwich structure can be substantially-free of adhesives.

At least one of the two or more foam sheet cores can have a different functional characteristic than the rest of the two or more foam sheet cores.

The foregoing and/or other aspects and utilities exemplified in the present disclosure may also be achieved by providing a method of making a foam sheet core for a composite sandwich structure, including stacking two or more foam sheets into a foam sheet block; bonding the stacked foam sheet block; and slicing the bonded foam sheet block into one or more strips of foam sheet, wherein the foam sheet core includes a plurality of foam sheet walls defining an array of hollow cells, and wherein the plurality of foam sheet walls can be fusion bonded together to form the array of hollow cells.

The method can further include expanding the one or more strips of foam sheet into a foam sheet core, and coating the foam sheet core with a resin coat.

The method can further include filling one or more hollow cells of the array of hollow cells.

The foregoing and/or other aspects and utilities exemplified in the present disclosure may also be achieved by providing a method of making a composite sandwich structure including providing one or more foam sheet cores; and bonding the one or more foam sheet cores to one or more skin panels, wherein each of the one or more foam sheet cores includes a plurality of foam sheet walls defining an array of hollow cells.

The method can further include curing the one or more skin panels.

Further areas of applicability will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The accompanying drawings, which are incorporated in, and constitute a part of this specification, illustrate implementations of the present teachings and, together with the description, serve to explain the principles of the disclosure. In the figures.

Figure 1:
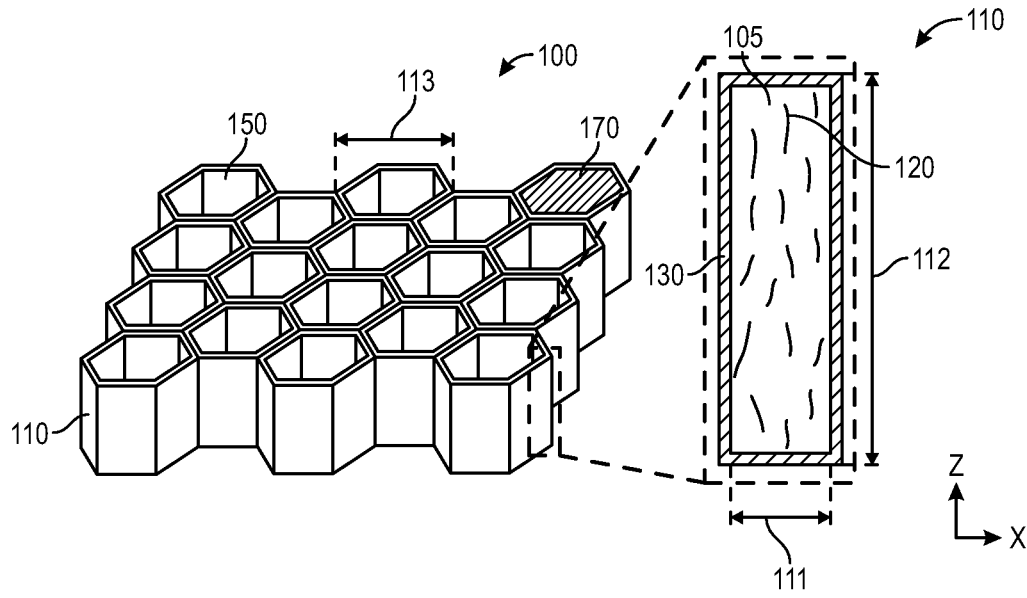
FIG. 1 illustrates a foam sheet core according to an implementation of the present disclosure.

It should be noted that some details of the figures have been simplified and are drawn to facilitate understanding of the present teachings rather than to maintain strict structural accuracy, detail, and scale.

DETAILED DESCRIPTION

Reference will now be made in detail to exemplary implementations of the present teachings, examples of which are illustrated in the accompanying drawings. Generally, the same reference numbers will be used throughout the drawings to refer to the same or like parts.

Throughout the specification and claims, the following terms take the meanings explicitly associated herein, unless the context clearly dictates otherwise. Phrases, such as, "in an implementation," "in certain implementations," and "in some implementations" as used herein do not necessarily refer to the same implementation(s), though they may. Furthermore, the phrases "in another implementation" and "in some other implementations" as used herein do not necessarily refer to a different implementation, although they may. As described below, various implementations can be readily combined, without departing from the scope or spirit of the present disclosure.

As used herein, the term "or" is an inclusive operator, and is equivalent to the term "and/or," unless the context clearly dictates otherwise. The term "based on" is not exclusive and allows for being based on additional factors not described unless the context clearly dictates otherwise. In the specification, the recitation of "at least one of A, B, and C," includes implementations containing A, B, or C, multiple examples of A, B, or C, or combinations of A/B, A/C, B/C, A/B/B/B/B/C, A/B/C, etc. In addition, throughout the specification, the meaning of "a," "an," and "the" include plural references. The meaning of "in" includes "in" and "on." Similarly, implementations of the present disclosure may suitably comprise, consist of, or consist essentially of, the elements A, B, C, etc.

It will also be understood that, although the terms first, second, etc. can be used herein to describe various elements, these elements should not be limited by these terms. These terms are only used to distinguish one element from another. For example, a first object, component, or step could be termed a second object, component, or step, and, similarly, a second object, component, or step could be termed a first object, component, or step, without departing from the scope of the invention. The first object, component, or step, and the second object, component, or step, are both, objects, components, or steps, respectively, but they are not to be considered the same object, component, or step. It will be further understood that the terms "includes," "including," "comprises" and/or "comprising," when used in this specification, specify the presence of stated features, steps, operations, elements, and/or components, but do not preclude the presence or addition of one or more other features, steps, operations, elements, components, and/or groups thereof. Further, as used herein, the term "if" can be construed to mean "when" or "upon" or "in response to determining" or "in response to detecting," depending on the context.

All physical properties that are defined hereinafter are measured at 20° to 25° Celsius unless otherwise specified.

When referring to any numerical range of values herein, such ranges are understood to include each and every number and/or fraction between the stated range minimum and maximum, as well as the endpoints. For example, a range of 0.5% to 6% would expressly include all intermediate values of, for example, 0.6%, 0.7%, and 0.9%, all the way up to and including 5.95%, 5.97%, and 5.99%, among many others. The same applies to each other numerical property and/or elemental range set forth herein, unless the context clearly dictates otherwise.

Additionally, all numerical values are "about" or "approximately" the indicated value, and take into account experimental error and variations that would be expected by a person having ordinary skill in the art. It should be appreciated that all numerical values and ranges disclosed herein are approximate values and ranges. The terms "about" or "substantial" and "substantially" or "approximately," with reference to amounts or measurement values, are meant that the recited characteristic, parameter, or values need not be achieved exactly. Rather, deviations or variations, including, for example, tolerances, measurement error, measurement accuracy limitations, and other factors known to those skilled in the art, may occur in amounts that do not preclude the effect the characteristic was intended to provide. As used herein, "about" is to mean within +/−10% of a stated target value, maximum, or minimum value Unless otherwise specified, all percentages and amounts expressed herein and elsewhere in the specification should be understood to refer to percentages by weight. The percentages and amounts given are based on the active weight of the material. For example, for an active ingredient provided as a solution, the amounts given are based on the amount of the active ingredient without the amount of solvent or may be determined by weight loss after evaporation of the solvent.

With regard to procedures, methods, techniques, and workflows that are in accordance with some implementations, some operations in the procedures, methods, techniques, and workflows disclosed herein can be combined and/or the order of some operations can be changed.

FIG. 1 illustrates a foam sheet core according to an implementation of the present disclosure. As illustrated in FIG. 1, a foam sheet core 100 includes a plurality of foam sheet walls 110 defining an array of hollow cells 150.

The array of hollow cells 150 can be formed into different array configurations. For example, as illustrated in FIG. 1, the array of hollow cells 150 can be formed into a hexagonal honeycomb array.

Figure 2:
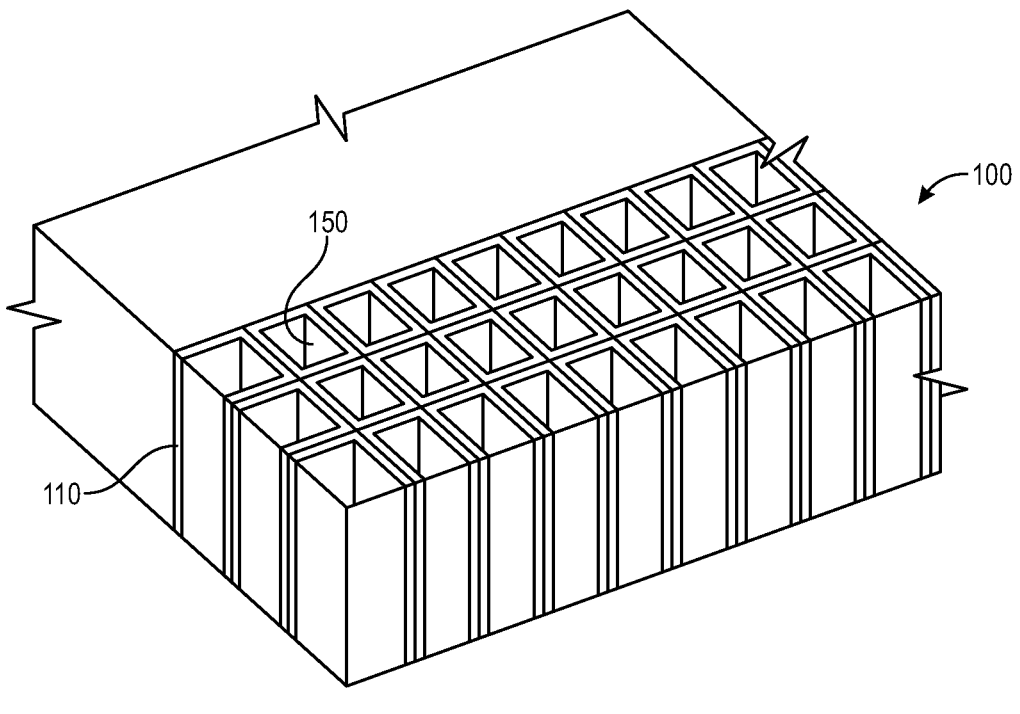
FIG. 2 illustrates a foam sheet core according to an implementation of the present disclosure.
Figure 3:
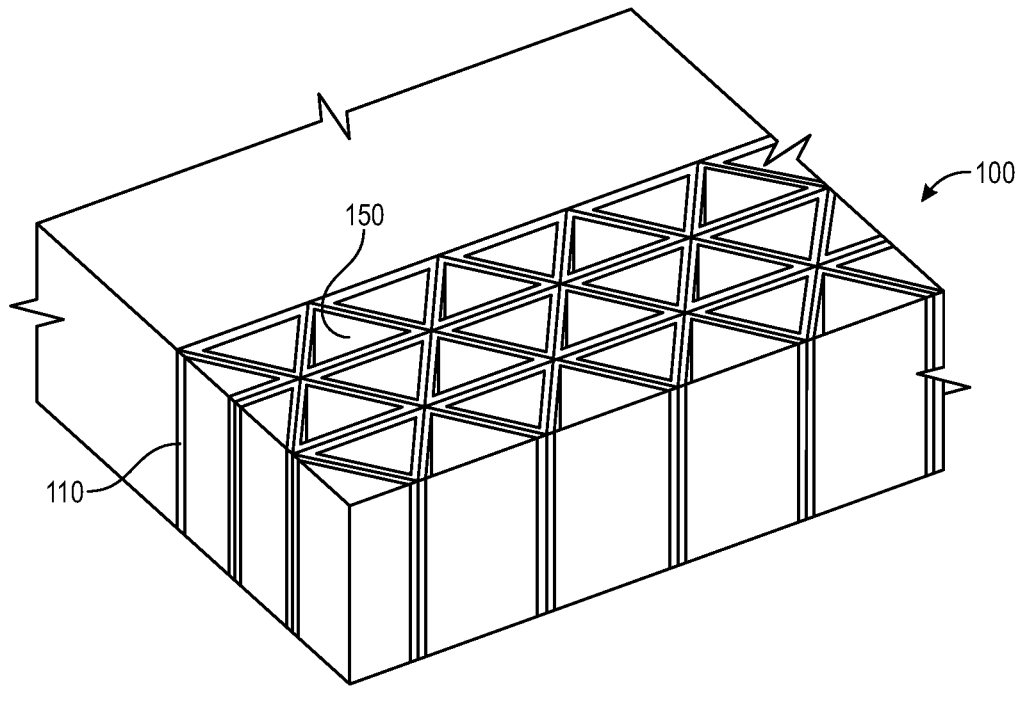
FIG. 3 illustrates a foam sheet core according to an implementation of the present disclosure.

FIGS. 2-3 illustrates foam sheet cores according to implementations of the present disclosure. As illustrated in FIGS. 2-3, the array of hollow cells 150 can also be formed into a geometric squared-shaped array or a geometric triangle-shaped array depending on how the plurality of foam sheet walls 110 are bonded together. The shape of the array of hollow cells 150 can be chosen according to a purpose and/or performance requirements of the foam sheet core 100.

The plurality of foam sheet walls 110 can be bonded together to form the array of hollow cells 150. In one implementation, the plurality of foam sheet walls 110 are fusion bonded together to form the array of hollow cells 150. For example, in some implementations, the foam sheet walls 110 can be implemented as strips of a foamed polymer 105 bonded together to form an array of hollow cells 150.

In one implementation, portions of a foam sheet wall 110 can be fusion bonded to portions of another foam sheet wall 110 to define the array of hollow cells 150. As used herein, the term "fusion bonding" refers to the bonding substrates without any additional intermediate layers, such as an adhesive layer designed to bond substrates. The adhesive layer may include a thermoplastic film layer. For example, two foam sheet walls 110 may be fusion bonded by thermal means, and the plurality of foam sheet walls 110 can be thermally fusion bonded together to form the array of hollow cells 150. For example, the plurality of foam sheet walls 110 can be thermally fusion bonded at a temperature higher than a melting temperature (Tm) of a foamed polymer 105 of the plurality of foam sheet walls 110.

In some implementations, the plurality of foam sheet walls 110 have a rough and/or non-uniform surface configured to enhance a fusion bonding of the plurality of foam sheet walls 110.

In one implementation, the foam sheet core 100 includes a plurality of foam sheet walls 110 defining an array of hollow cells 150, wherein the plurality of foam sheet walls 110 are fusion bonded together to form the array of hollow cells 150.

As described above, the plurality of foam sheet walls 110 can be bonded without the use of adhesives, such as a thermoplastic film layer designed to bond substrates. Accordingly, the array of hollow cells 150 can therefore not include adhesives. In some implementations, the foam sheet core 100 does not include adhesives. For example, the foam sheet core 100 can be adhesive-free or the foam sheet core 100 can be substantially-free of adhesives. In some implementations, the foam sheet core 100 consists essentially of a plurality of foam sheet walls 110 defining an array of hollow cells 150.

In other implementations, for example, where weight concerns are lessened or there is no need to avoid the use of adhesives, the plurality of foam sheet walls 110 can be bonded using adhesives in addition to or instead of fusion bonding. In some implementations, the use of adhesives can provide additional reliability and strength characteristics to the bond over fusion bonding alone.

For example, portions of a foam sheet wall 110 can be bonded to portions of another foam sheet wall 110 using an adhesive, such as a thermoplastic film layer designed to bond the foam sheet walls 110, to define the array of hollow cells 150.

As illustrated in FIG. 1, each of the hollow cells 150 can have an average diameter 113 from about 0.1 inches to about 1.0 inches. For example, the hollow cells 150 can have an average diameter 113 from about 0.1 inches to about 0.50 inches or from about 0.1 inches to about 0.25 inches. In some implementation, the hollow cells 150 have an average diameter 113 from about 0.1 inches to about 0.14 inches or from about 0.34 inches to about 0.41 inches.

As illustrated in FIG. 1, the array of hollow cells 150 can have an average height 112 along a long axis Z from about 0.05 inches to about 5 inches. For example, each of the hollow cells 150 can have an average height 112 from about 0.50 inches to about 4 inches, from about 0.50 inches to about 3 inches, or from about 0.50 inches to about 2 inches.

In some implementations the hollow cells 150 have an average height 112 along a long axis Z from about 0.50 inches to about 1.0 inches, from about 0.75 inches to about 1.25 inches, or from about 3.75 inches to about 4.25 inches. Accordingly, each of the plurality of foam sheet walls 110 can have an average height from about 0.05 inches to about 5 inches. For example, each of the plurality of foam sheet walls 110 can have an average height 112 from about 0.50 inches to about 4 inches, from about 0.50 inches to about 3 inches, or from about 0.50 inches to about 2 inches.

As illustrated in FIG. 1, each foam sheet wall 110 can have an average thickness 111 along a short axis X from about 0.002 inches to about 0.08 inches. For example, each foam sheet wall 110 can have an average thickness 111 from about 0.005 inches to about 0.04 inches or from about 0.01 inches to about 0.02 inches. In some implementations, each foam sheet wall 110 can have an average thickness 111 from about 0.0035 inches to about 0.0045 inches or from about 0.036 inches to about 0.044 inches.

The average diameter, height, and thickness of the hollow cells 150 and/or the foam sheet walls 110 forming the array of hollow cells 150, together with the material of the foam sheet walls 110, can determine the functional and physical characteristics of the resulting foam sheet core 100. For example, a rigidity or stiffness of a composite sandwich structure incorporating the foam sheet core 100 varies according to at least one of a thickness of the plurality of foam sheet walls 110, an average diameter of the hollow cells 150, and a material of the foam sheet walls 110. As used herein, the terms "rigidity or stiffness" refer to a resistance to deformation in response to an applied force or moment.

The plurality of foam sheet walls 110 can have a uniform thickness throughout the foam sheet core 100. In other implementations, at least one of the plurality of foam sheet walls 110 can have a different average thickness than an average thickness for the rest of the plurality of foam sheet walls 110. In yet other implementations, at least a portion of one of the plurality of foam sheet walls 110 can have a different average thickness than an average thickness for the rest of the plurality of foam sheet walls 110.

The plurality of foam sheet walls 110 can include a foamed polymer 105. The foamed polymer 105 can be capable of forming thin sheets of foamed polymer. For example, the foamed polymer 105 can include one or more of a thermoplastic polymer, a thermoset polymer, an epoxy polymer, or combinations thereof. In some implementations, the foam sheet walls 110 consist essentially of the foamed polymer 105. In other implementations, at least one of the plurality of foam sheet walls 110 consists essentially of the foamed polymer 105.

According to implementations of the present disclosure, foam sheet walls 110 formed of a foamed polymer 105 can have a weight advantage over traditional paper or laminate honeycomb materials while offering similar or improve functional characteristics, such as stiffness, rigidity, impact resistance, etc.

The foamed polymer 105 can include phenolic, epoxy, polystyrene (PS), polyethylene (PE), polypropylene (PP), polyamide (PA), polyethylene terephthalate (PET), polyether ether ketone (PEEK), polyetherketoneketone (PEKK), polycarbonate (PC), polyetherimide (PEI), polyphenylsulfone (PPSU), thermoplastic polyurethane (TPU), acrylonitrile butadiene styrene (ABS), polyvinyl Chloride (PVC), polyurethane (PU), or combinations thereof. For example, the foamed polymer 105 can include at least one of PET, PS, PEI, PPSU, or combinations thereof. In some implementations, the foamed polymer 105 can include at least one of PET and PS due to the strength and flammability performance of these materials for aerospace applications.

In some implementations, the technical characteristics or properties of the plurality of foam sheet walls 110 can vary according to a material of the plurality of foam sheet walls 110. Accordingly, the plurality of foam sheet walls 110 can include the same foamed polymer 105. In other implementations, at least one of the plurality of foam sheet walls 110 includes a different foamed polymer 105 than the rest of the plurality of foam sheet walls 110.

The foamed polymer 105 can have a relative density to solid from about 2.5% to about 100%. For example, the foamed polymer 105 can have a relative density from about 20% to about 90%, from about 30% to about 80%, or from about 50% to about 60%. Accordingly, the foam sheet walls 110 can have a relative density to solid from about 2.5% to about 100%, from about 20% to about 90%, from about 50% to about 60%, or from about 30% to about 80%. As used herein, the term "relative density" refers to the foamed polymer 105 density divided by the corresponding solid polymer density.

If the density of the foamed polymer 105 is too low, the foam sheet core 100 may be too weak and can be easily flattened or crushed. However, if the density of the foamed polymer 105 is too high, the foam sheet core 100 may tend to break when the foam sheet walls 110 are expanded, a surface of the foam sheet core 100 may be too smooth (or its surface energy too low) resulting in lesser fusion bonding quality. Accordingly, in some implementations, a relative density from about 50% to 60% can provide a good balance between weight reduction, foam sheet surface energy, and strength.

The foamed polymer 105 can be configured to withstand a curing temperature for a composite material. For example, the foamed polymer 105 can have a melting temperature from about 270° F. to about 800° F. In some implementations, the foamed polymer 105 has a melting temperature of 250° F. or greater, 350° F. or greater, or 750° F. or greater.

The foamed polymer 105 can be configured to withstand a curing pressure for a composite material. For example, the foamed polymer 105 can withstand a pressure from about 5 psi to about 300 psi without substantial deformation.

As illustrated in FIG. 1, in some implementations, the plurality of foam sheet walls 110 can include reinforcing fibers 120. In general, the plurality of foam sheet walls 110 can include any suitable reinforcing fibers 120. The reinforcing fibers 120 can be used to increase the strength and stiffness of the plurality of foam sheet walls 110. The reinforcing fibers can include one or more of carbon fibers, fiberglass fibers, aramid fibers, polyester fibers, hemp fibers, wood fibers, or combinations thereof. Other fibers that can be used include talc fibers, wollastonite fibers, metal fibers, aromatic polyamide fibers, or combinations thereof. The plurality of foam sheet walls 110 described herein can further include reinforcing fibers, and the reinforcing fibers include one or more of carbon fibers, fiberglass fibers, aramid fibers, ultra-high molecular weight polyethylene (UHMWPE) fibers, polyester fibers, polypropylene (PP) fibers, polyethylene (PE) fibers, polyamide fibers, or combinations thereof. For example, the reinforcing fibers 120 can include one or more of carbon fibers, fiberglass fibers, aramid fibers, or combinations thereof. The reinforcing fibers 120 can potentially improve properties of the resulting foam core 100, such as, shear strength at various directions, leading to stronger and stiffer components.

In some implementations, the foam sheet walls 110 consist essentially of the foamed polymer 105 and the reinforcing fibers 120. In other implementations, at least one of the plurality of foam sheet walls 110 consists essentially of the foamed polymer 105 and the reinforcing fibers 120.

As illustrated in FIG. 1, in some implementations, the foam sheet core 100 can include a resin coat 130. In general, the foam sheet core 100 can include any suitable resin coat 130. The resin coat 130 can be used to increase functional characteristics of the foam sheet core 100, such as flame retardance and stiffness, among other things. As illustrated in FIG. 1, the resin coat 130 can cover external surfaces of the plurality of foam sheet walls 110 and may be applied by dipping the foam sheet core 100 in the resin coat 130. The resin coat 130 can include one or more of epoxy resin coat, phenolic resin coat, vinylester, polyester resins, or combinations thereof. However, in some implementations, the foam sheet core 100 does not include a resin coat 130.

As illustrated in FIG. 1, the array of hollow cells 150 can include a filling material 170. In general, the filling material 170 is configured to enhance a functional characteristics of the foam sheet core 100. For example, the filling material 170 can enhance at least one of a fire-retardance of the foam sheet core 100, a rigidity or stiffness of the foam sheet core 100, an acoustic insulation of the foam sheet core 100, an impact resistance of the foam sheet core 100, or combinations thereof. In some implementations, the filling material 170 is the same as the foamed polymer 105 forming the foam sheet wall 110. In other implementations, the filling material 170 is different from the foamed polymer 105 forming the foam sheet wall 110.

The filling material 170 can include at least one of rubber foam, epoxy, phenolic, polystyrene (PS) foam, polyurethane (PU) foam, polyester foam, melamine foam, or combinations thereof.

In some implementations, at least one of the hollow cells 150 in the array of hollow cells 150 includes a filling material 170. In other implementations, all of the hollow cells 150 in the array of hollow cells 150 include a filling material 170. In some implementations, the filling material 170 filling the hollow cells 150 is the same for all of the hollow cells 150 in the array of hollow cells 150. In other implementations, at least one filling material 170 filling a hollow cell 150 is different from the rest of the filling material 170 filling the other hollow cells 150 in the array of hollow cells 150. As described above, the filling material 170 inside at least one of the hollow cells 150 can enhance at least one of a fire-retardance of the foam sheet core 100, a rigidity or stiffness of the foam sheet core 100, an acoustic insulation of the foam sheet core 100, an impact resistance of the foam sheet core 100, or combinations thereof.

Figure 4:
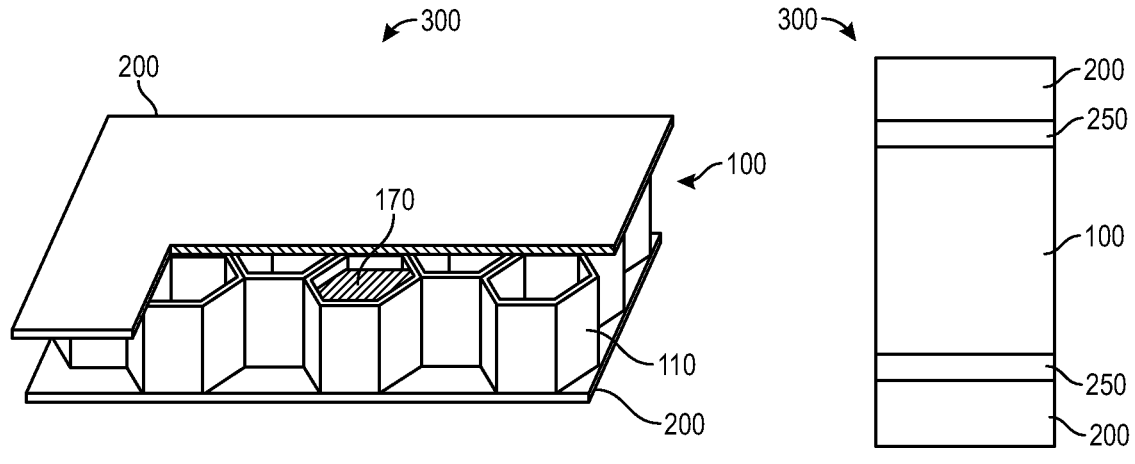
FIG. 4 illustrates a composite sandwich structure according to an implementations of the present disclosure.

FIG. 4 illustrates a composite sandwich structure according to an implementations of the present disclosure. FIG. 4 illustrates a composite sandwich structure that, for instance, could use the foam sheet core 100 described above and illustrated in FIGS. 1-3. As such, the discussion below will reference various components as illustrated in FIG. 1-3. As illustrated in FIG. 4, a composite sandwich structure 300 includes a foam sheet core 100 and one or more skin panels 200. The foam sheet core 100 can include a plurality of foam sheet walls 110 defining an array of hollow cells 150, wherein the plurality of foam sheet walls 110 are bonded together to form the array of hollow cells 150.

The one or more skin panels 200 are bonded to the foam sheet core 100. For example, the foam sheet core 100 can be fusion bonded to the one or more skin panels 200. In one implementation, the foam sheet core 100 is thermally fusion bonded to the one or more skin panels 200. In other embodiment, the foam sheet core 100 is fusion bonded to the one or more skin panels 200 by the application of heat and/or pressure. For example, by applying a curing temperature and/or pressure to the one or more skin panels 200 and melting a foamed polymer 105 of the foam sheet core 100 enough to fusion bond the foam sheet core 100 to the one or more skin panels 200. In some implementations, the foamed polymer 105 provides the foam sheet core 100 a rough and/or non-uniform surface configured to enhance a fusion bonding to the one or more skin panels 200. When an outer skin of the foam sheet core 100 is molten, the underlying cellular layers can be exposed to heat, resulting in large fusion bonding contacting surfaces. Accordingly, when surfaces of the foam sheet core 100 are fusion bonded, the molten materials can be better mixed and fused together, enhancing fusion bonding quality. In some implementations, fusion bonding the foam sheet core 100 enhances high speed fusion bonding, such as high-speed fusion bonding using a roll-fed system to feed rolls of foam sheet 10 as described below.

As described above, the foam sheet core 100 can be fusion bonded to the one or more skin panels 200 without the use of adhesives. Accordingly, the composite sandwich structure can therefore not include adhesives or adhesive layers. In some implementations, the composite sandwich structure 300 is adhesive-free or substantially-free of adhesives. In some implementations, the composite sandwich structure 300 consists essentially of the foam sheet core 100 and the one or more skin panels 200.

In other implementations, the composite sandwich structure 300 further includes adhesive layers 250, such as a thermoplastic film layer, designed to bond the foam sheet core 100 to the one or more skin panels 200.

The one or more skin panels 200 can include one or more of a metal, a ceramic, a thermoplastic material, a thermoset material, or combinations thereof. For example, the one or more skin panels 200 can include one or more of a thermoplastic material or a thermoset material. The one or more skin panels 200 can include one or more of phenolic, epoxy, polypropylene (PP), polyamide (PA), polyethylene terephthalate (PET), polyether ether ketone (PEEK), polyetherketoneketone (PEKK), polycarbonate (PC), polyetherimide (PEI), polyphenylsulfone (PPSU), thermoplastic polyurethane (TPU), acrylonitrile butadiene styrene (ABS), polyvinyl Chloride (PVC), polyurethane (PU), or combinations thereof. In some implementations, at least one of the one or more skin panels 200 includes a metal, such as aluminum.

At least one of the one or more skin panels 200 can be an uncured composite skin panel or pre-preg. Carbon fiber plies that have been impregnated with an uncured thermoset resin or a thermoplastic resin are referred to as "pre-preg." As used herein, the term "pre-preg" refers to pre-impregnated composite plies, such as epoxy impregnated unidirectional composite tape or carbon fiber. A pre-preg may be flexible until it is cured, often by heat and pressure curing or curing within an autoclave. Other types of carbon fiber include "dry fiber" which has not been impregnated with thermoset resin but may include a tackifier or binder. Dry fiber may be infused with resin prior to curing. For thermoset resins, the hardening is a one-way process referred to as curing, while for thermoplastic resins, the resin may reach a viscous form if it is re-heated. In other implementations, the one or more skin panels 200 can be a cured composite skin panel.

The one or more skin panels 200 can further comprise reinforcing fibers. The reinforcing fibers of the one or more skin panels 200 can include one or more of carbon fibers, fiberglass fibers, aramid fibers, or combinations thereof. The reinforcing fibers of the one or more skin panels 200 can include the reinforcing fibers 120.

Figure 5:
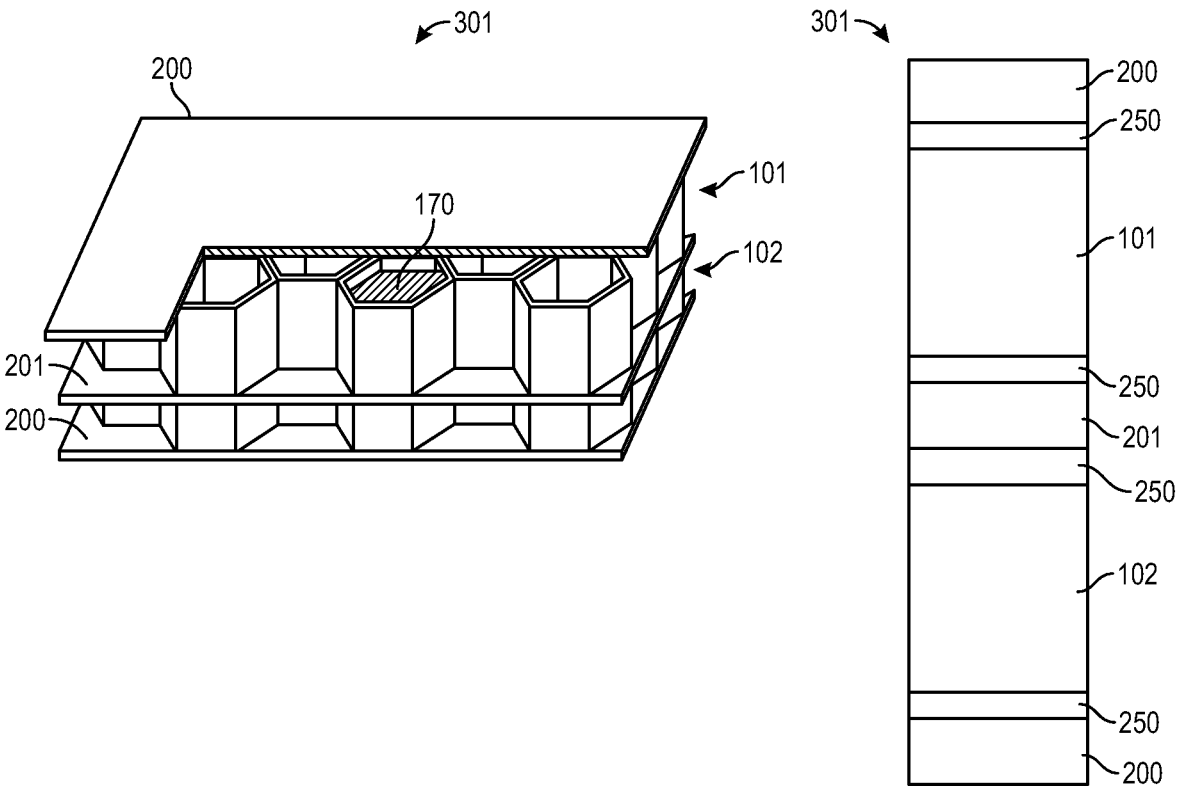
FIG. 5 illustrates a multi-core composite sandwich structure according to an implementation of the present disclosure.

FIG. 5 illustrates a multi-core composite sandwich structure according to an implementation of the present disclosure. FIG. 5 illustrates a multi-core composite sandwich structure that, for instance, could use the foam sheet core 100 and/or the composite sandwich structure 300 described above and illustrated in FIGS. 1-4. As such, the discussion below will reference various components as illustrated in FIG. 1-4.

As illustrated in FIG. 5, a multi-core composite sandwich structure 301 can include two or more foam sheet cores 100 and one or more skin panels 200. In some implementations, the two or more foam sheet cores 100 can be separated by one or more intermediate skins or septum 201. For example, as illustrated in FIG. 5, a multi-core composite sandwich structure 301 includes one or more skin panels 200, a first foam sheet core 101, a septum 201, and a second foam sheet core 102. The first foam sheet core 101 and the second foam sheet core 102 are implementations of the foam sheet core 100 illustrated in FIGS. 1-3. The septum 201 can be an implementation of the one or more skin panels 200 and include the same materials as described above. In some implementations, the septum 201 can provide structural stiffness, stabilization and/or vibration dampening to the foam sheet core 100.

In other implementations, the septum 201 can include the foamed polymer 105. For example, the septum 201 can be formed of the same materials as the foam sheet walls 110.

The septum 201 can include one or more of fiber reinforced laminates, thermoset (epoxies, phenolics, etc.), thermoplastic solid sheets, thermoplastic foam sheets, or combinations thereof.

The two or more foam sheet cores 100 can be bonded to the one or more skin panels 200 and/or the one or more septum 201. The two or more foam sheet cores 100 can be fusion bonded and/or can be bonded using adhesives. For example, as illustrated in FIG. 4, the first and second foam sheet cores 101 and 102 are bonded to the one or more skin panels 200 and the septum 201. The two or more foam sheet cores 100 can be fusion bonded. For example, the first and second foam sheet cores 101 and 102 can be fusion bonded to the one or more skin panels 200 and the septum 201. In some implementations, the multi-core composite sandwich structure 301 is adhesive-free or substantially-free of adhesives. In some implementations, the multi-core composite sandwich structure 301 consists essentially of two or more foam sheet cores 100, one or more skin panels 200, and one or more septum 201. In other implementations, the multi-core composite sandwich structure 301 further includes adhesive layers 250, such as a thermoplastic film layer, designed to bond the first and second foam sheet cores 101 and 102 to the one or more skin panels 200 and the septum 201.

The two or more foam sheet cores 100 can be the same or can be different. For example, at least one of the two or more foam sheet cores 100 can have a different functional characteristic than the rest of the two or more foam sheet cores 100. The functional characteristics of the two or more foam sheet cores 100 can be determined by an average thickness of the foam sheet walls 110 and/or by a filling material 170 in the array of hollow cells 150. In some implementations, an average thickness of the foam sheet walls 110 of one foam sheet core 100 is different from an average thickness of the foam sheet walls 110 for the rest of the foam sheet cores 100. In other implementations, a filling material 170 for at least one of the hollow cells 150 of a foam sheet core 100 is different from a filling material 170 of a hollow cell 150 of the rest of the foam sheet cores 100. For example, first foam sheet core 101 can have a different functional characteristic than second foam sheet core 102 illustrated in FIG. 5.

In one implementation, an average thickness of the foam sheet walls 110 forming the first foam sheet core 101 is different than an average thickness of the foam sheet walls 110 forming the second foam sheet core 102, and therefore, a rigidity or stiffness of the first foam sheet core 101 is different from a rigidity or stiffness of the second foam sheet core 102. In another implementation, at least a portion of the first foam sheet core 101 includes foam sheet walls 110 with a different average thickness than the rest of the first foam sheet core 101 and/or an average thickness of the foam sheet walls 110 forming the second foam sheet core 102. Accordingly, a rigidity or stiffness of said portion of the first foam sheet core 101 is different from a rigidity or stiffness of the second foam sheet core 102.

The first foam sheet core 101 can include a different number or type of filling materials 170 such that the functional characteristics of the first foam sheet core 101 is different than the functional characteristics of the second foam sheet core 102. For example, the filling materials 170 used in the first foam sheet core 101 may be selected to improve a first retardance of the first foam sheet core 101, whereas the filling materials 170 used in the second foam sheet core 102 may be selected to improve an impact resistance of the second foam sheet core 102.

Figure 6:
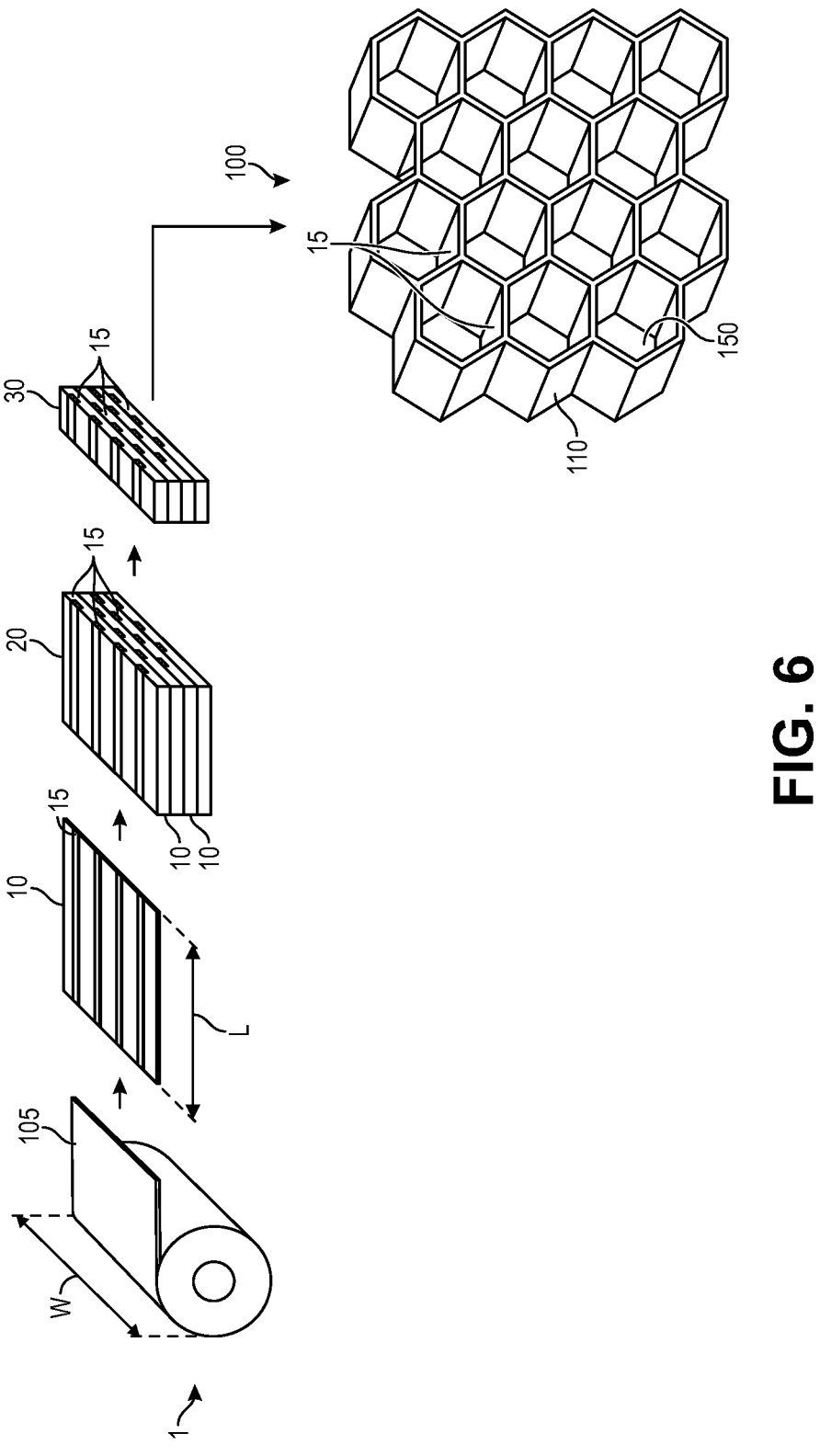
FIG. 6 illustrates a method of making a foam sheet core according to an implementation of the present disclosure.
Figure 7:
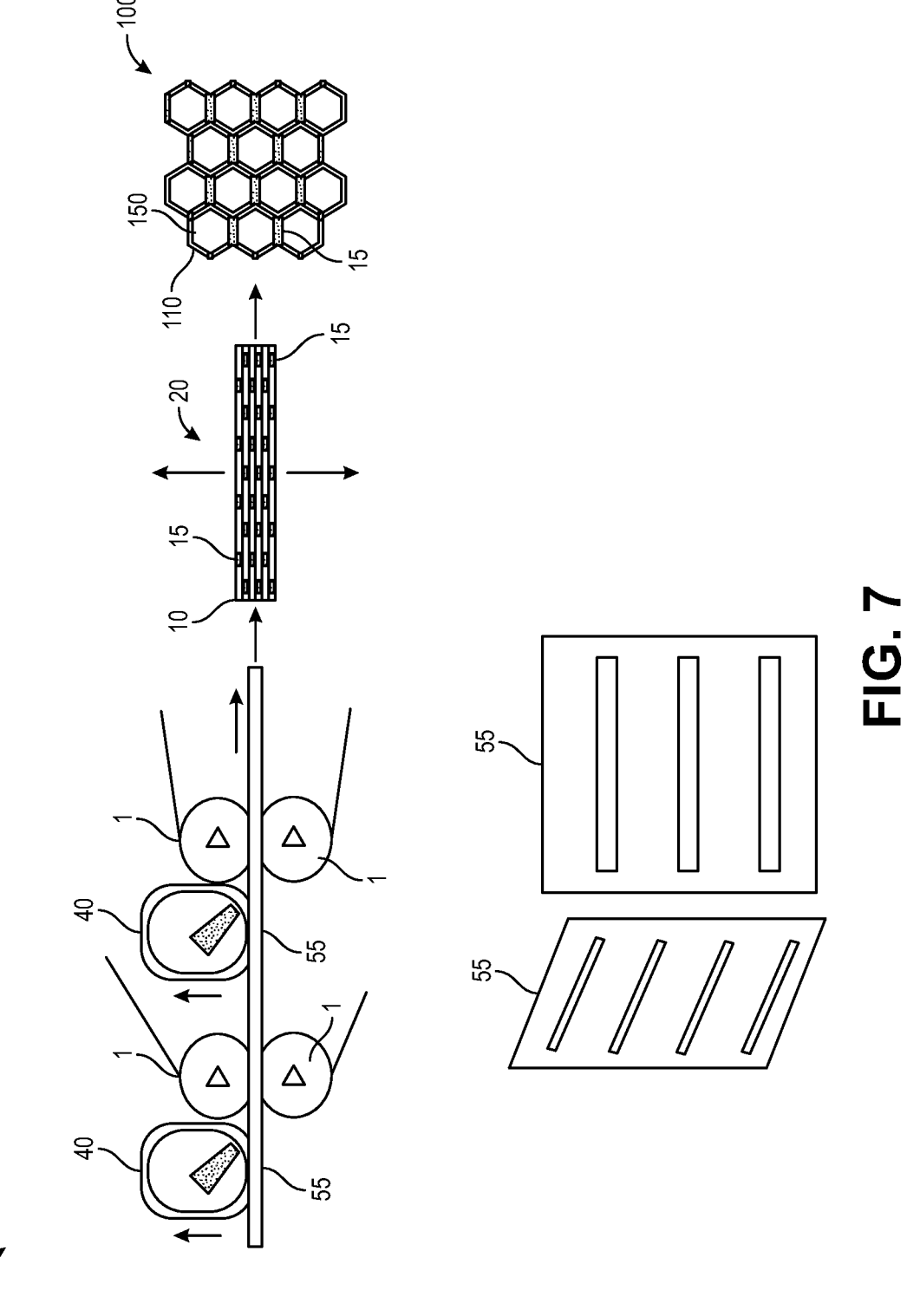
FIG. 7 illustrates an apparatus for bonding continuous foam sheets according to an implementation.
Figure 8:
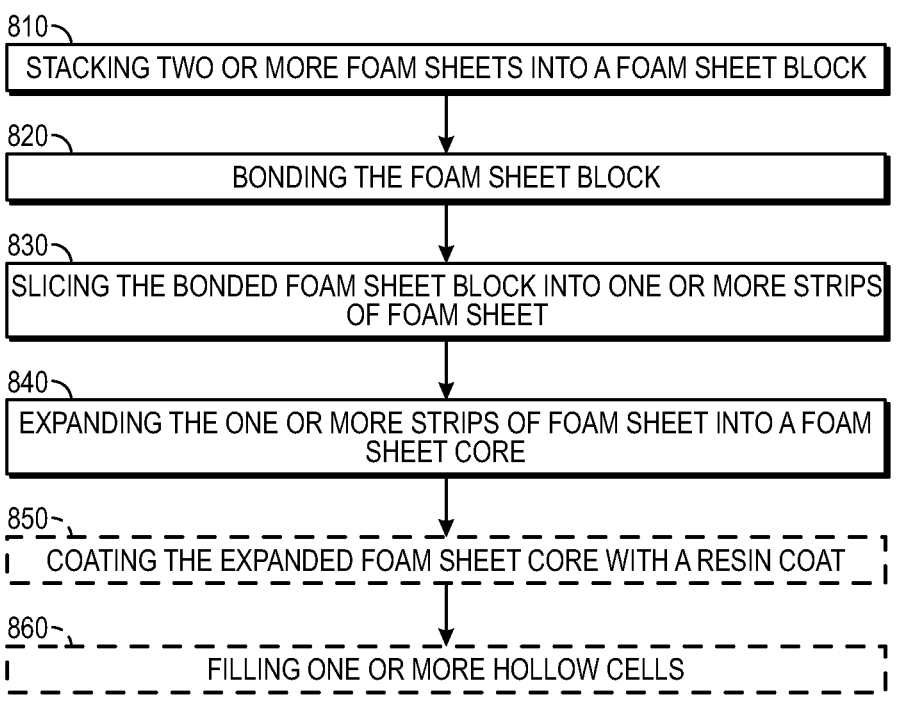
FIG. 8 illustrates a flow diagram for the method of making a foam sheet core according to an implementation.

FIG. 6 illustrates a method of making a foam sheet core according to an implementation of the present disclosure. FIG. 7 illustrates an apparatus for bonding continuous foam sheets. FIG. 8 illustrates a flow diagram for the method illustrated in FIG. 6. FIGS. 6-8 illustrate methods that, for instance, could be used to make the foam sheet core 100 described above. As such, the discussion below will reference various components as illustrated in FIG. 1-5.

As illustrated in FIGS. 6-8, a method 800 for making a foam sheet core 100 begins with stacking two or more foam sheets 10 into a foam sheet block 20 in operation 810.

The foam sheets 10 can be cut from a roll of foam sheet 1. For example, a roll of foam sheet 1 provides a continuous foam sheet 10 of foamed polymer 105 that is cut into two or more foam sheets 10 of a predetermined length L. A width of the foam sheets 10 can correspond to a width W of the roll of foam sheet 1.

Stacking two or more foam sheets 10 into a foam sheet block 20 can include providing two or more continuous rolls of foam sheet 10 and rolling them together to form a foam sheet block 20. The length L of the foam sheet block 20 can correspond to a thickness of the foam sheet core 100 after core expansion. In other implementations, the foam sheet block 20 can be sliced along the width W to make foam sheet cores 100 with smaller thickness.

Operation 820 includes bonding the foam sheet block 20. For example, the two or more foam sheets 10 can be bonded as they are sequentially stacked into the foam sheet block 20. In one implementation, a first foam sheet 10 is place in a stack and a second foam sheet 10 is placed over the first foam sheet 10. The second foam sheet 10 is then bonded to the first foam sheet 10. The second foam sheet 10 can be bonded to the first foam sheet 10 only in selected areas. For example, the second foam sheet 10 can be thermally fusion bonded to the first foam sheet 10 using hot metal stamping. A third foam sheet 10 is then placed on the second foam sheet 10 and then at least partially bonded to the second foam sheet 10. As illustrated in FIG. 6, the bonds 15 are staggered, such that, the bonds 15 bonding the third foam sheet 10 and the second foam sheet 10 do not directly overlap the bonds 15 bonding the first foam sheet 10 and the second foam sheet 10. The two or more foam sheets 10 can be fusion bonded or can be bonded using an adhesive or adhesive layer. The bonds 15 between the two or more foam sheets 10 can include surface areas, lines, or points where the fusion sheets are bonded. For example, as illustrated in FIG. 6, the bonds 15 can include an area of contact between surfaces of two contacting foam sheets 10.

In other implementations, the foam sheet block 20 can be formed by fusion bonding two or more foam sheets 10 provided from two or more rolls of foam sheet 1. For example, FIG. 7 illustrates an apparatus for bonding continuous foam sheets 10. As illustrated in FIG. 7, an apparatus 500 includes two or more rolls of foam sheet 1 to provide continuous foam sheets 10 of foamed polymer 105 and one or more bonders 40. The bonders 40 can use moving blocking plates 55 with open slots to thermally bond two or more continuous foam sheets 10 of foamed polymer 105 together. For example, the continuous foam sheets 10 of foamed polymer 105 can be fusion bonded using hot air with moving blocking plates 55.

In other implementations, the bonders 40 can use moving blocking plates 55 (e.g., travelling) with open slots of loop type or reciprocating type. As illustrated in FIG. 7, two or more continuous foam sheets 10 of foamed polymer 105 can be fusion bonded with a staggered bonds 15 and cut to a length corresponding to a width of the resulting foam sheet core 100 to form the foam sheet block 20. The staggered bonds 15 can include an area of bonding, a line of bonding, or points of bonding between the two or more continuous foam sheets 10 of foamed polymer 105. In some implementations, an average thickness of the foamed polymer 105 in one or more of the two or more rolls of foam sheet 1 is different than an average thickness for the rest of the two or more rolls of foam sheet 1 to vary a thickness of the resulting foam sheet walls 110 in the foam sheet core 100, as described above.

Operation 830 includes slicing the bonded foam sheet block 20 into one or more strips of foam sheet 30. As illustrated in FIG. 6, after the two or more foam sheets 10 are bonded together into a bonded foam sheet block 20, the bonded foam sheet block 20 can be sliced along a width to create one or more strips of foam sheet 30. The bonded foam sheet block 20 can be sliced for example, using a bandsaw. In other implementations, the bonded foam sheet block 20 can be sliced for example, using a hot wire cutter.

Operation 840 includes expanding the one or more strips of foam sheet 30 into a foam sheet core 100. As illustrated in FIG. 6, the one or more strips of foam sheet 30 form a plurality of foam sheet walls 110 defining an array of hollow cells 150 when expanded into a foam sheet core 100.

In some implementations, the method 800 further comprises coating the foam sheet core 100 with a resin coat 130 in operation 850. The foam sheet core 100 can be dip-coated with the resin coat 130. In other implementations, the foam sheet core 100 does not include a resin coat 130.

The functional characteristics of the foam sheet core 100 can be adjusted by adding a filling material 170 into one or more of the hollow cells 150 of the array of hollow cells 150. Accordingly, in some implementations, the method 800 further includes adjusting one or more functional characteristics of the foam sheet core 100 by filling one or more of the hollow cells 150 of the array of hollow cells 150 with a filling material 170 in operation 860. For example, the filling material 170 can enhance at least one of a fire-retardance of the foam sheet core 100, a rigidity or stiffness of the foam sheet core 100, an impact resistance of the foam sheet core 100, or combinations thereof.

Figure 9:
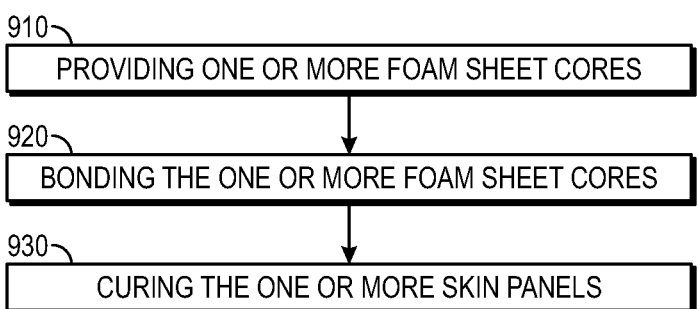
FIG. 9 illustrates a method of making a composite sandwich structure according to an implementation of the present disclosure.

FIG. 9 illustrates a method of making a composite sandwich structure according to an implementation of the present disclosure. FIG. 9 illustrate a method that, for instance, could be used to make the foam sheet core 100 and the composite sandwich structure 300 described above. As such, the discussion below will reference various components as illustrated in FIG. 1-8.

As illustrated in FIG. 9, a method of making a composite sandwich structure begins with providing one or more foam sheet cores 100 in operation 910. Each of the one or more foam sheet cores 100 can include a plurality of foam sheet walls 110 defining an array of hollow cells 150. In some implementation, the plurality of foam sheet walls 110 are fusion bonded together to form the array of hollow cells 150.

Operation 920 include bonding the one or more foam sheet cores 100 to one or more skin panels 200. The one or more skin panels 200 may include one or more septum 201. The one or more foam sheet cores 100 can be fusion bonded to the one or more skin panels 200. The one or more foam sheet cores 100 can be bonded to the one or more skin panels 200 using an adhesive.

In some implementations, the one or more skin panels 200 are cured before they are bonded to the one or more foam sheet cores 100. In other implementations, the one or more skin panels 200 are pre-pregs or uncured before they are bonded to the one or more foam sheet cores 100.

The one or more foam sheet cores 100 can be bonded to the one or more skin panels 200 during a curing process. Accordingly, the method 900 may further include curing the one or more skin panels 200 in operation 930. In some implementations, applying a curing temperature and/or pressure to the one or more skin panels 200 fusion bonds the one or more foam sheet cores 100 to the one or more skin panels 200. In other implementations, the one or more foam sheet cores 100 are already bonded to the one or more skin panels 200 before a curing temperature and/or pressure is applied.

Figure 10:
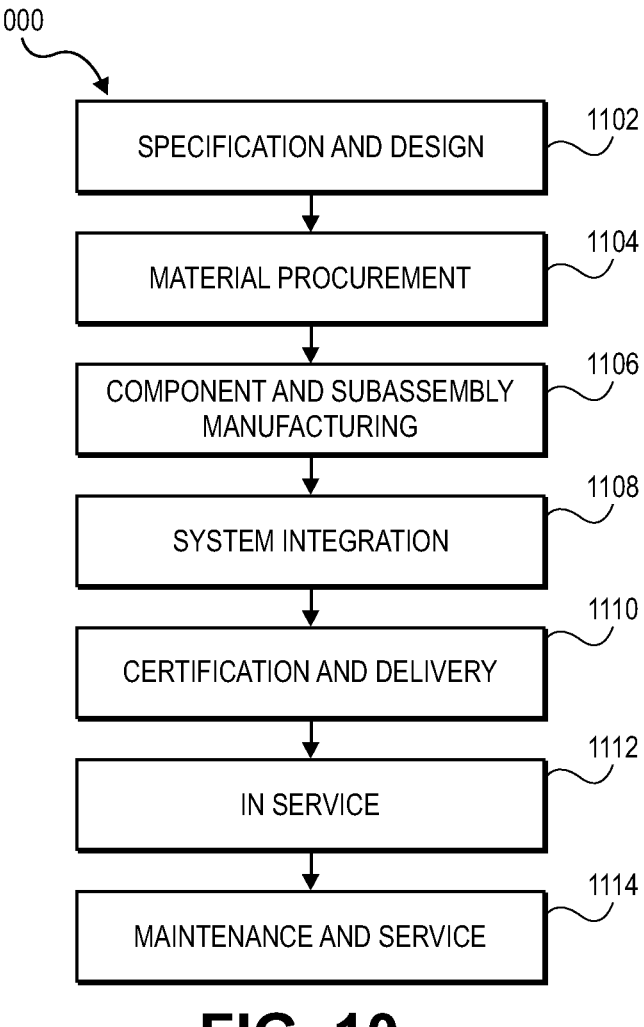
FIG. 10 illustrates a flow diagram of aircraft production and service methodology.
Figure 11:
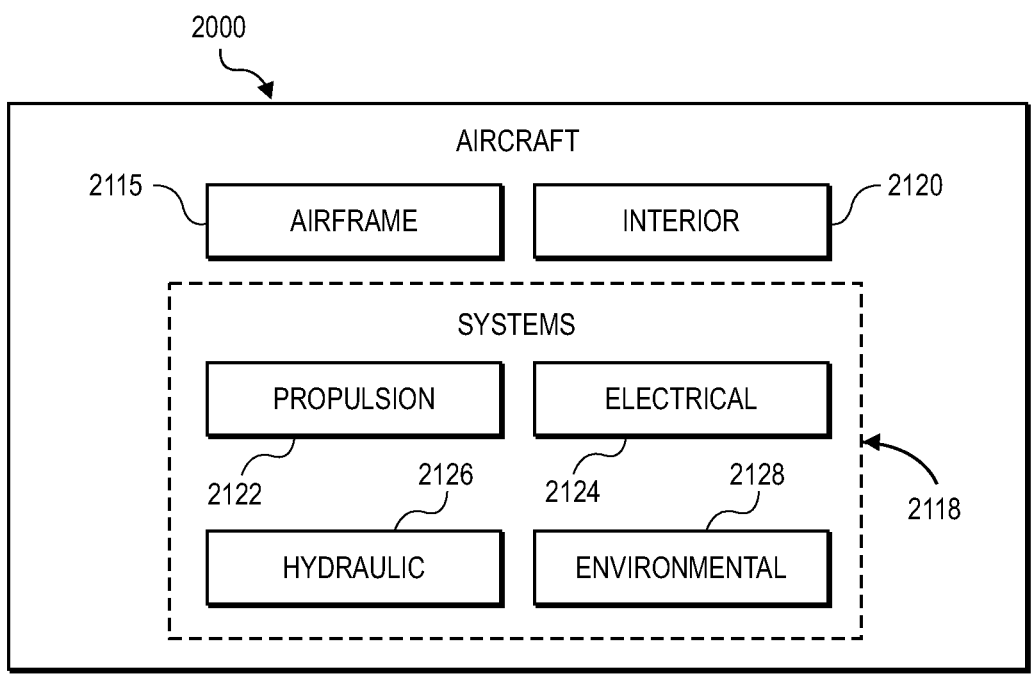
FIG. 11 illustrates a block diagram of an aircraft.

Implementations of the present disclosure may find use in a variety of potential applications, particularly in the transportation industry, including for example, aerospace, marine, rail, automotive applications, and other application where composite sandwich structures are desired. However, the present disclosure is not limited thereto, and implementations of the present disclosure may be used in applications outside the transportation industry. Thus, referring now to FIGS. 10 and 11, implementations of the disclosure may be used in the context of an aircraft manufacturing and service method 1000 as shown in FIG. 10 and an aircraft 2000 as shown in FIG. 11. While FIG. 11 is described in terms of an aircraft 2000, the present disclosure is not limited thereto, and the service method 1000 can be applied to other structures. During pre-production, exemplary method 1000 may include specification and design 1102 of the aircraft 2000 and material procurement 1104. During production, component and subassembly manufacturing 1106 and system integration 1108 of the aircraft 2000 takes place. Thereafter, the aircraft 2000 may go through certification and delivery 1110 in order to be placed in service 1112. While in service by a customer, the aircraft 2000 is scheduled for routine maintenance and service 1114, which may also include modification, reconfiguration, refurbishment, and so on.

Each of the processes of method 1000 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 11, the aircraft 2000 produced by exemplary method 1000 may include an airframe 2115 with a plurality of systems 2118 and an interior 2120. Examples of systems 2118 include one or more of a propulsion system 2122, an electrical system 2124, a hydraulic system 2126, and an environmental system 2128. Any number of other systems may be included. Although an aerospace example is shown, the principles of the disclosure may be applied to other industries, such as the marine and automotive industries.

Systems and methods exemplified herein may be employed during any one or more of the stages of the aircraft manufacturing and service method 1000. For example, components or subassemblies corresponding to component and subassembly manufacturing 1106 may be fabricated or manufactured in a manner similar to components or subassemblies produced while the aircraft 2000 is in service. Also, one or more apparatus examples, method examples, or a combination thereof may be utilized during the component and subassembly manufacturing 1106 and system integration 1108, for example, by substantially expediting assembly of or reducing the cost of an aircraft 2000. Similarly, one or more of apparatus examples, method examples, or a combination thereof may be utilized while the aircraft 2000 is in service, for example and without limitation, to maintenance and service 1114.

While FIGS. 10 and 11 describe the disclosure with respect to aircraft and aircraft manufacturing and servicing, the present disclosure is not limited thereto. The systems and methods of the present disclosure may also be used for spacecraft, satellites, rotorcraft, submarines, surface ships, automobiles, autonomous vehicles, tanks, trucks, power plants, railway cars, and any other suitable type of objects.

The present disclosure has been described with reference to exemplary implementations. Although a few implementations have been shown and described, it will be appreciated by those skilled in the art that changes can be made in these implementations without departing from the principles and spirit of preceding detailed description. It is intended that the present disclosure be construed as including all such modifications and alterations insofar as they come within the scope of the appended claims or the equivalents thereof.

What is claimed is:

1. A method of making a foam sheet core for a composite sandwich structure, comprising:
   stacking two or more foam sheets into a foam sheet block;
   fusion bonding the stacked foam sheet block;
   slicing the bonded foam sheet block into one or more strips of foam sheet; and
   expanding the one or more strips of foam sheet into a foam sheet core,
   wherein the two or more foam sheets comprise a foamed polymer with a relative density to solid from about 30% to about 80% and a melting temperature from about 270° F. to about 800° F., and
   wherein the foam sheet core comprises a plurality of foam sheet walls fusion bonded together to form an array of hollow cells.

2. The method of claim 1, wherein the bonding of the stacked foam sheet block comprising fusion bonding the two or more foam sheets together as they are stacked into the foam sheet block.

3. The method of claim 2, wherein the two or more foam sheets are fusion bonded using hot air with moving blocking plates.

4. The method of claim 2, wherein the plurality of foam sheet walls comprise a foamed polymer having a relative density to solid from about 50% to about 60% that are fusion bonded together to form the array of hollow cells, and wherein the foam sheet core does not include an adhesive.

5. The method of claim 1, further comprising filling one or more hollow cells of the array of hollow cells with a filling material.

6. The method of claim 5, wherein the filling material comprises at least one of rubber foam, epoxy, phenolic, polystyrene (PS) foam, polyurethane (PU) foam, polyester foam, melamine foam, or combinations thereof.

7. The method of claim 6, wherein the filling material is different from the foamed polymer forming the foam sheet walls, and wherein the filling material enhances at least one of a fire-retardance of the foam sheet core, a rigidity or stiffness of the foam sheet core, an acoustic insulation of the foam sheet core, an impact resistance of the foam sheet core, or combinations thereof.

8. The method of claim 1, wherein each of the plurality of foam sheet walls has a thickness from about 0.002 inches to about 0.08 inches, and wherein each of the plurality of foam sheet walls has an average height from about 0.05 inches to about 5 inches.

9. The method of claim 8, wherein each of the array of hollow cells has an average diameter from about 0.1 inches to about 1.0 inches.

10. The method of claim 1, wherein the foamed polymer comprises at least one of phenolic, epoxy, polystyrene (PS), polyethylene (PE), polypropylene (PP), polyamide (PA), polyethylene terephthalate (PET), polyether ether ketone (PEEK), polyetherketoneketone (PEKK), polycarbonate (PC), polyetherimide (PEI), polyphenylsulfone (PPSU), thermoplastic polyurethane (TPU), acrylonitrile butadiene styrene (ABS), polyvinyl Chloride (PVC), polyurethane (PU), or combinations thereof.

11. The method of claim 10, wherein at least one of the plurality of foam sheet walls comprises a different foamed polymer than the rest of the plurality of foam sheet walls.

12. The method of claim 1, wherein the plurality of foam sheet walls further comprise reinforcing fibers, and wherein the reinforcing fibers comprise one or more of carbon fibers, fiberglass fibers, aramid fibers, ultra-high molecular weight polyethylene (UHMWPE) fibers, polyester fibers, polypropylene (PP) fibers, polyethylene (PE) fibers, polyamide fibers, or combinations thereof.

13. The method of claim 1, further comprising coating the foam sheet core with a resin coat.

14. A method of making a composite sandwich structure comprising:
   providing one or more foam sheet cores; and
   fusion bonding the one or more foam sheet cores to one or more skin panels to form the composite sandwich structure,
   wherein the one or more foam sheet cores comprise a plurality of foam sheet walls fusion bonded together to form an array of hollow cells, and
   where the plurality of foam sheet walls comprise a foamed polymer with a relative density to solid from about 30% to about 80% and a melting temperature from about 270° F. to about 800° F.

15. The method of claim 14, wherein the one or more foam sheet cores are formed by stacking two or more foam sheets into a foam sheet block, bonding the foam sheet block, slicing the bonded foam sheet block into a strip of foam sheet, and expanding the strip of foam sheet into a foam sheet core.

16. The method of claim 15, wherein the plurality of foam sheet walls comprise a foamed polymer having a relative density to solid from about 50% to about 60% that are fusion bonded together to form the array of hollow cells, and wherein each of the plurality of foam sheet walls has a thickness from about 0.002 inches to about 0.08 inches.

17. The method of claim 16, wherein the bonding of the foam sheet block comprises fusion bonding the two or more foam sheets together as they are stacked into the foam sheet block, and wherein the two or more foam sheets are fusion bonded using hot air with moving blocking plates.

18. The method of claim 14, wherein the one or more foam sheet cores do not include an adhesive.

19. The method of claim 14, wherein the one or more foam sheet cores are fusion bonded to the one or more skin panels.

20. The method of claim 19, wherein the one or more skin panels are uncured before bonding, and wherein bonding the one or more foam sheet cores to the one or more skin panels comprises applying a curing temperature or pressure to the one or more skin panels to fusion bond the one or more foam sheet cores to the one or more skin panels.

\* \* \* \* \*